Jan. 31, 1967   J. BERZAC   3,301,424
DECANTER AND HOLDER THEREFOR
Filed Oct. 24, 1963
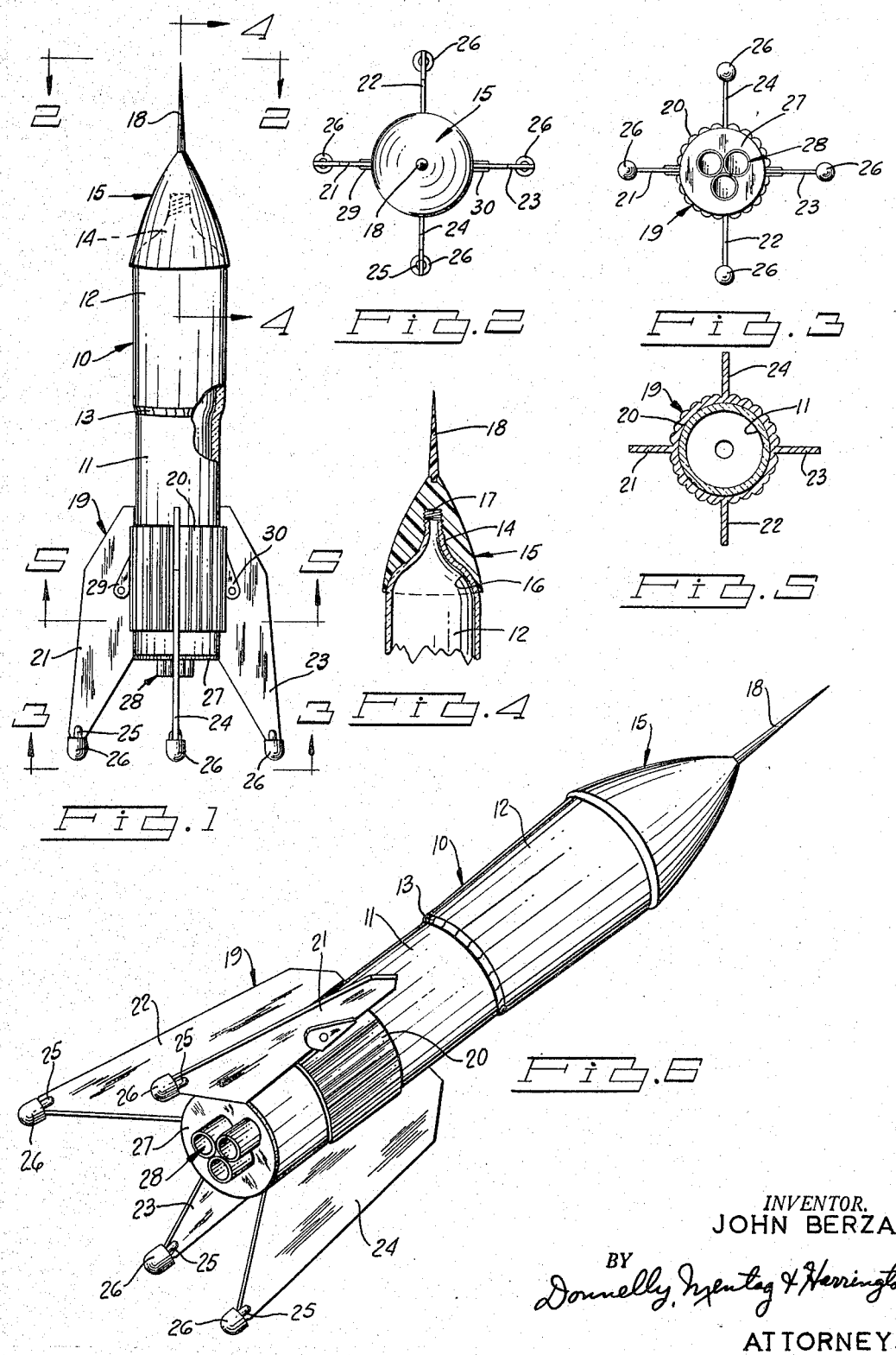
INVENTOR.
JOHN BERZAC
BY Donnelly, Mentag & Harrington
ATTORNEYS

United States Patent Office 3,301,424
Patented Jan. 31, 1967

3,301,424
DECANTER AND HOLDER THEREFOR
John Berzac, St. Clair Shores, Mich., assignor to Astro Manufacturing, Inc., Roseville, Mich., a corporation of Michigan
Filed Oct. 24, 1963, Ser. No. 318,703
2 Claims. (Cl. 215—12)

This invention relates to a novel decanter and holder and more particularly to a combination decanter and holder having the overall appearance of a missile.

It is an object of the present invention to provide a novel and improved decanter which simulates in appearance a rocket disposed in a vertical position.

It is another object of the present invention to provide a combination decanter and holder which is pleasing and attractive in appearance and which is adapted to function as a useful decanter for liquors and the like.

It is still another object of the present invention to provide a combination decanter and holder which is simple and compact in construction, economical of manufacture and which is easy to use and operate.

It is a further object of the present invention to provide a combination decanter and holder which may be made from any suitable materials, as metal, glass or plastics, and which may be colored as desired and used as a novelty sales promotion or give-away item for stores, or which may be used as a special liquor bottle by liquor companies during various holiday periods.

It is still another object of the present invention to provide a combined decanter and holder which includes a container shaped like the body of a missile, a releasably mounted cap on the container which is shaped like the nose cone of a missile, and a holder for the container which is formed to give the apperance of the lower end of a missile with its guiding fins.

Other objects, features and advantages of this invention will be apparent from the following detailed description, appended claims, and the accompanying drawing.

In the drawing:

FIG. 1 is a side elevational view of a decanter and holder made in accordance with the principles of the present invention, and showing part of the decanter body broken away;

FIG. 2 is a top plan view of the structure illustrated in FIG. 1, taken along the line 2—2 thereof and looking in the direction of the arrows;

FIG. 3 is a bottom plan view of the structure illustrated in FIG. 1, taken along the line 3—3 thereof and looking in the direction of the arrows;

FIG. 4 is a fragmentary elevational sectional view of the structure illustrated in FIG. 1, taken along the line 4—4 thereof and looking in the direction of the arrows;

FIG. 5 is a horizontal sectional view of the structure illustrated in FIG. 1, taken along the line 5—5 thereof and looking in the direction of the arrows; and, FIG. 6 is a perspective view of the structure illustrated in FIG. 1.

Referring now to the drawing and in particular to FIGS. 1 and 6 wherein is shown a decanter and holder made in accordance with the principles of the invention, the numeral 10 generally indicates the decanter body or container. The body 10 is formed as a glass bottle having the lower cylindrical portion 11 and the upper portion 12 which has the upwardly diverging walls joined at the lower end thereof at 13 to the lower cylindrical portion 11. As shown in FIG. 4, the upper end of the decanter body portion 12 is provided with the curved neck portion 14 which is threaded on the upper end thereof in the usual manner of a liquor bottle.

The decanter further includes the cap generally indicated by the numeral 15 which has an overall conical outer configuration to give the appearance of a missile nose cone. The cap 15 may be made out of any suitable material, as for example, a suitable plastic, and may be colored as desired. The decanter cap 15 is provided with the curved hollow center 16 which opens at the lower end of the cap 15 and which is shaped to conform to the curved upper neck portion of the bottle or body 10. The inner end of the cap hollow portion 16 is threaded as indicated by the numeral 17 for threaded engagement with the upper end of the bottle neck 14 for enclosing the same. The cap 15 is provided with a needle shaped pointed nose 18 which may be of soft rubber, and be detachably mounted in the upper end of the cap 15 as by a press fit.

As shown in FIGS. 1, 2, 3, 5 and 6, the numeral 19 generally indicates the decanter holder or stand. The holder 19 includes the vertical cylinder or ring 20 which is open on each end thereof and which may be made from any suitable material, as for example, a die cast material. As best seen in FIGS. 3 and 5, the outer surface of the ring 20 may be formed with a plurality of vertically disposed curved surfaces for decorative purposes. The holder 19 further includes a plurality of vertically disposed fins 21, 22, 23 and 24. These fins are evenly circumferentially disposed around the ring 20 and are preferably integrally formed with the ring 20. These fins are shaped to give the appearance of the usual fins on the lower end of a missile. Each of these fins is provided on the lower end thereof with a vertical round extension or leg 25 on which is press fitted a rubber pad 26 for supporting the decanter on a table or other surface. A circular horizontal plate 27 is fixedly mounted between the fins 21, 22, 23 and 24 at a position spaced below the lower end of the ring 20. As shown in FIGS. 1 and 6, the lower end of the bottle portion 11 is adapted to be seated on the plate 27 to support the decanter body 10 in a vertical position. The plate 27 is provided on the lower side thereof with the integral outwardly extended simulated exhaust tubes generally indicated by the numeral 28. The fins 21 and 22 may also be provided with simulated attachment means as indicated by the numerals 29 and 30.

It will be seen that the aforedescribed structure provides a combination decanter and holder for containing liquor or other fluids. Liquid may be poured from the decanter body 10 by grasping the body 10 with one hand and unscrewing the cap 15 with the other hand. The holder 19 will support the decanter body 10 in a vertical position to give the overall combination of structure the appearance of a missile ready for a take-off.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In combination, a decanter and holder comprising: an elongated container which is closed at the lower end and open at the upper end; a cap releasably mounted on said open upper end of said container; said container and cap being shaped in the form of a missile; a holder for supporting the container in an upright position; said holder including a ring-shaped member for the reception of the lower end of said container, a plurality of fins connected to said ring-shaped member for supporting the same, and a plate carried by said fins at a position spaced downwardly from said ring-shaped member for supporting the lower end of said container.

2. In combination, a decanter and holder comprising: an elongated container which is closed at the lower end and open at the upper end; a cap threadably mounted on said open upper end of said container and being formed with a conically shaped outer configuration; said container and cap having the appearance of a missile; a holder for supporting the container in an upright position; said holder including a ring-shaped member for the reception of the lower end of said container, a plurality of fins connected to said ring-shaped member for supporting the same, and a plate carried by said fins at a position spaced downwardly from said ring-shaped member for supporting the lower end of said container.

References Cited by the Examiner

UNITED STATES PATENTS

| | | | |
|---|---|---|---|
| 2,649,984 | 8/1953 | Abt | 215—12 |
| 2,704,903 | 3/1955 | Laughlin | 215—12 |
| 2,803,366 | 8/1957 | Forman | 215—12 |

JOSEPH R. LECLAIR, *Primary Examiner.*

GEORGE O. RALSTON, FRANKLIN T. GARRETT,
*Examiners.*

R. PESHOCK, *Assistant Examiner.*